Figure 2:
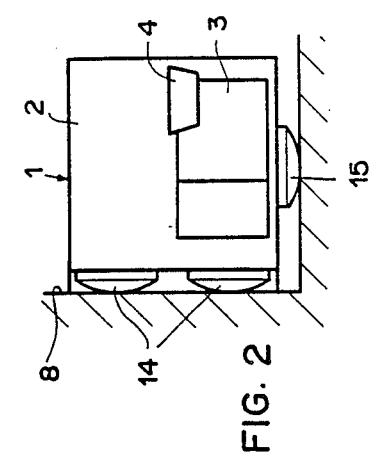
Figure 4:
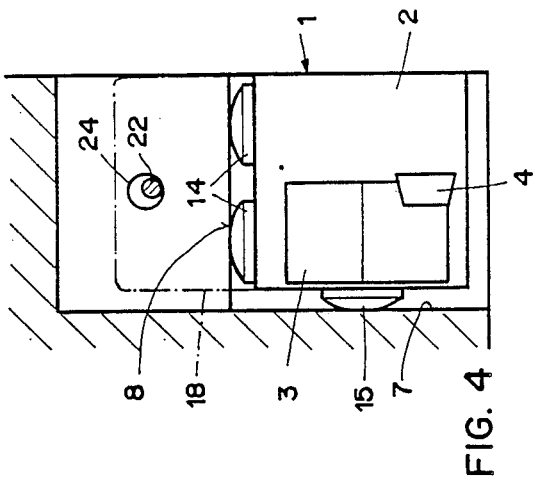
Figure 1:
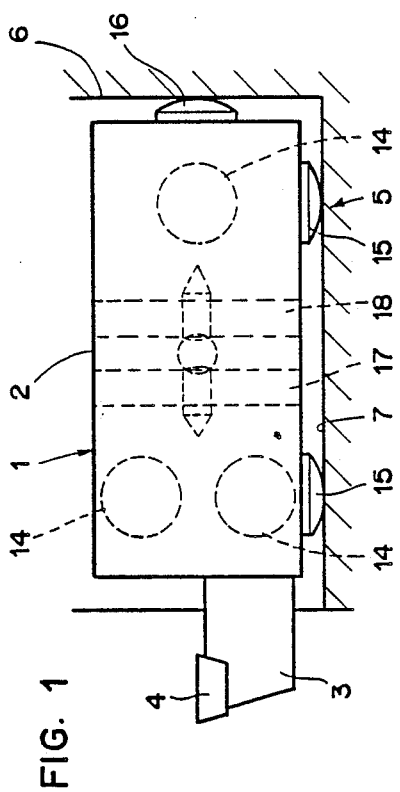

United States Patent [19]

Pruvot et al.

[11] Patent Number: 4,850,255
[45] Date of Patent: Jul. 25, 1989

[54] TOOL-HOLDER MOUNTING FOR MACHINE TOOLS

[75] Inventors: Francois Pruvot, La Conversion; Xavier Esteve, Moutier, both of Switzerland

[73] Assignee: Tornos-Bechler SA, Fabrique de Machines Moutier, Switzerland

[21] Appl. No.: 161,150

[22] Filed: Feb. 26, 1988

[30] Foreign Application Priority Data

Mar. 5, 1987 [CH] Switzerland .................. 861/87

[51] Int. Cl.$^4$ .................. B23B 29/04; B23B 29/12
[52] U.S. Cl. .................. 82/160; 82/161; 407/101; 409/241; 409/900.1; 409/900.2
[58] Field of Search .................. 82/36 R, 36 B, 37; 407/101, 108; 409/241, 900.1, 900.2; 269/217, 234, 296, 309, 310

[56] References Cited

U.S. PATENT DOCUMENTS

| | | | |
|---|---|---|---|
| 2,360,567 | 10/1944 | Lloyd | 82/36 R |
| 2,369,904 | 2/1945 | McKee | 82/901 |
| 2,591,692 | 4/1952 | Fricke | 82/37 |
| 2,707,419 | 5/1955 | Schron | 409/900.1 |
| 3,130,526 | 4/1964 | Decker | 409/900.2 |
| 3,252,202 | 5/1966 | Bullard et al. | 82/36 R |
| 3,466,955 | 9/1969 | Stier | 82/36 R |
| 3,572,195 | 3/1971 | Gourley | 82/36 R |
| 3,694,879 | 10/1972 | Kennicott et al. | 29/96 |
| 4,220,061 | 9/1980 | Tsukiji | 82/36 R |
| 4,390,172 | 6/1983 | Gotman | 269/309 |
| 4,708,040 | 11/1987 | Erickson | 82/36 R |

FOREIGN PATENT DOCUMENTS

| | | | |
|---|---|---|---|
| 2339086 | 8/1977 | France | . |
| 1134301 | 1/1985 | U.S.S.R. | 82/36 R |

OTHER PUBLICATIONS

Association of German Engineers (VDI), Standard 3425, Sheet 3, 11-1972 "Tool-System Prismatic Gripping Device".

Primary Examiner—Frederick R. Schmidt
Assistant Examiner—William E. Terrell
Attorney, Agent, or Firm—Oliff & Berridge

[57] ABSTRACT

The body (2) of the tool-holder (1) is equipped with spherical caps (14, 15, 16) which come to rest against the flat inside faces (6, 7, 8) of a trirectangular trihedron in the tool-mounting base. Flanges (17, 18) guide conical-tipped retaining pins (21, 22) in apertures (20, 21). These tips fit into conical recesses (23, 24). The rod (13) of a jack mounted on the base spreads the pins apart, and while entering the recesses, the pins exert on the tool-holder a force capable of immobilizing it and acting along a predetermined line of action.

9 Claims, 3 Drawing Sheets

TOOL-HOLDER MOUNTING FOR MACHINE TOOLS

This invention relates to machine tools, and more particularly to a device for mounting a tool-holder having a rigid body on a tool-mounting base in a machining center, of the type having on the mounting base or on the body of the tool-holder fixed support-surface portions defining a support trihedron, and on the other part of the device projecting surface portions, each intended to press against one of the support-surface portions, and means for applying a pressing force on the body of the tool-holder so as to press the projecting surface portions against the supporting-surface portions, each intended to press against one of the support-surface portions, and means for applying a pressing force to the body of the toolholder so as to press the projecting surface portions against the supportingsurface portions.

The development of machining centers is currently moving toward increasing as much as possible the number of machining operations which can be carried out on a workpiece without unchucking it. For this purpose, one or more turret heads, each equipped with a number of tool-holders, are sometimes provided near the workpiece-holder. However, another solution to the problem consists in providing a tool-mounting device at an appropriate location and equipping the machine with transfer means suitable for successively taking tools arranged in a magazine, conveying them, and mounting them automatically on the base in such a way that the respective tools are then in working position. One and the same machine may, of course, include several mounting bases, and this base or these bases may be mounted on movable supports having simple or cross slides or, as the case may be, with a pivot shaft. The mounting bases may be arranged to receive tool-holders supporting tools which are themselves rotary; in this case, the base will comprise a coupling having rotary-drive means acting upon the tool when it is in place.

According to standard 3425, sheet 3, of the Association of German Engineers (VDI), prismatic tool-holder bases are already known. These bases have several support faces, especially three faces, two of which form a dihedron, while the third, oriented perpendicular to the ridge of the dihedron, is a limited surface portion which bounds a groove in one of the faces of the dihedron. The body of the tool-holder must then have three matching faces which rest flat against the faces of the dihedron and against the third stop face when put in place. However, this arrangement does not ensure the position of the tool-holder relative to the base precisely enough in view of the machining requirements currently imposed. On the other hand, U.S. Pat. Nos. 3,694,879 and 4,220,061 and French Pat. No. 2,339,086 disclose devices for mounting a tool-holder on a base in a predetermined position by means capable of being automatically controlled. Until now, however, no prior art devices satisfies the requirements of the art to the full extent desirable.

It is therefore an object of this invention to remedy the shortcomings of the prior art devices and to provide an improved mounting device capable of being actuated in a simple manner and ensuring stable mounting of the tool-holder in a position which is predetermined with maximum precision.

To this end, in the tool-holder mounting device according to the present invention, of the type initially mentioned, the projecting surface portions are cap-shaped convex surfaces, the number and distribution of which are chosen in such a way as to ensure immobilization of the tool-holder body in a certain position independent of the machining forces, and the means for applying a pressing force comprise complementary retaining elements associated with the tool-holder body, on the one hand, and with the base, on the other hand, and an actuating component moving between an inactive position and a locking position when the tool-holder body is in working position, then actuating the retaining elements in such a way that the pressing force is exerted along a predetermined line of action dependent on the conformation of the retaining elements.

Figure 3:
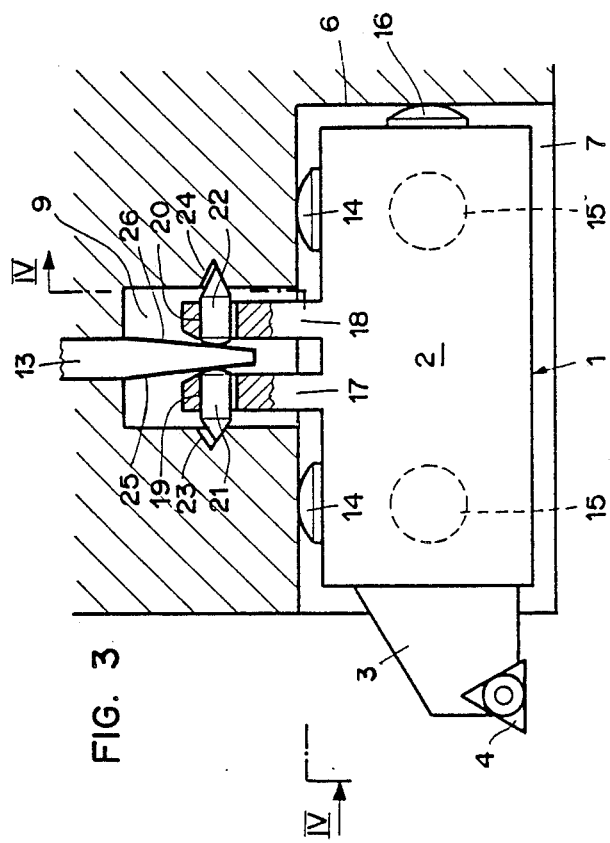
Figure 5:
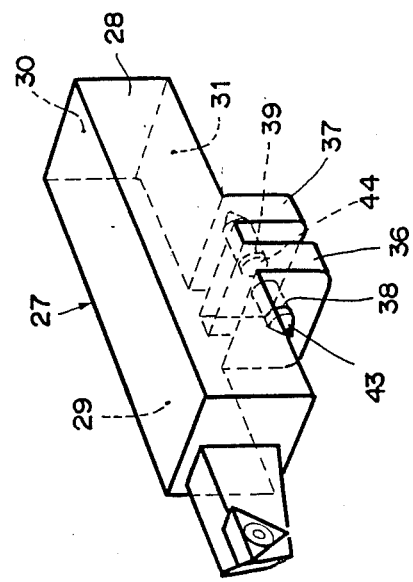
Figure 5:
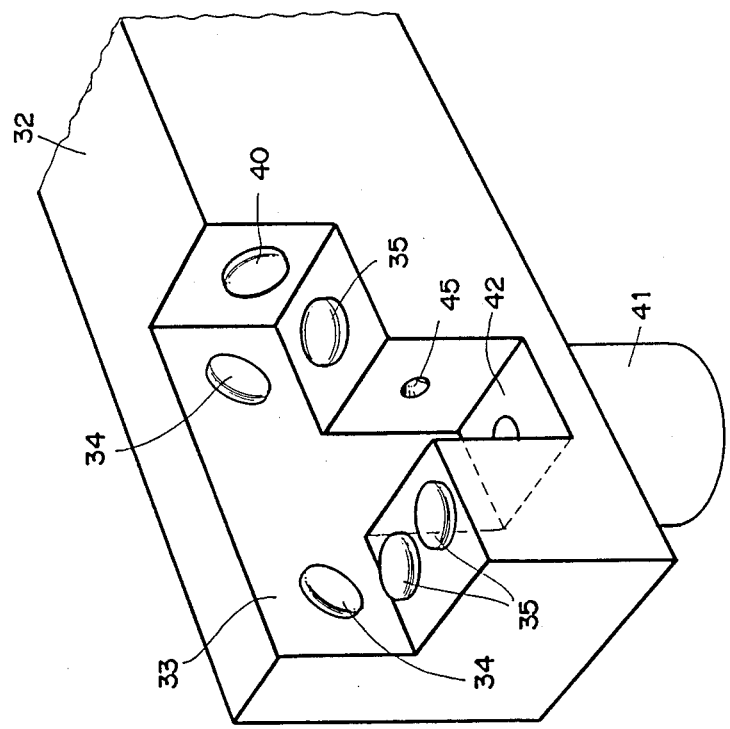
Figure 6:
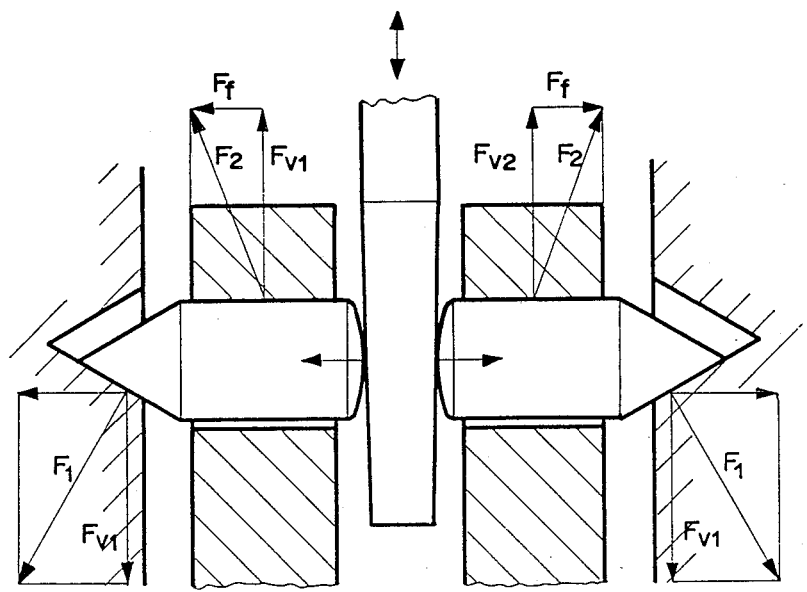
Figure 1:
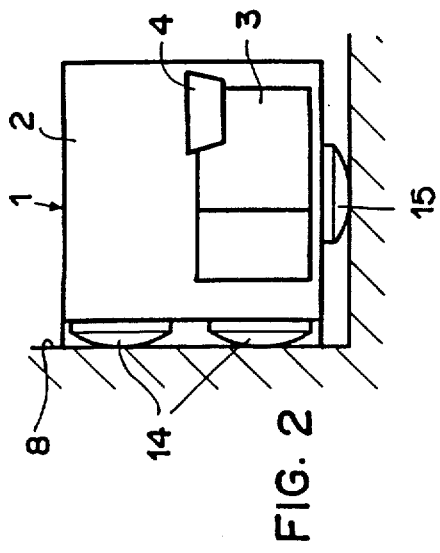
Figure 2:
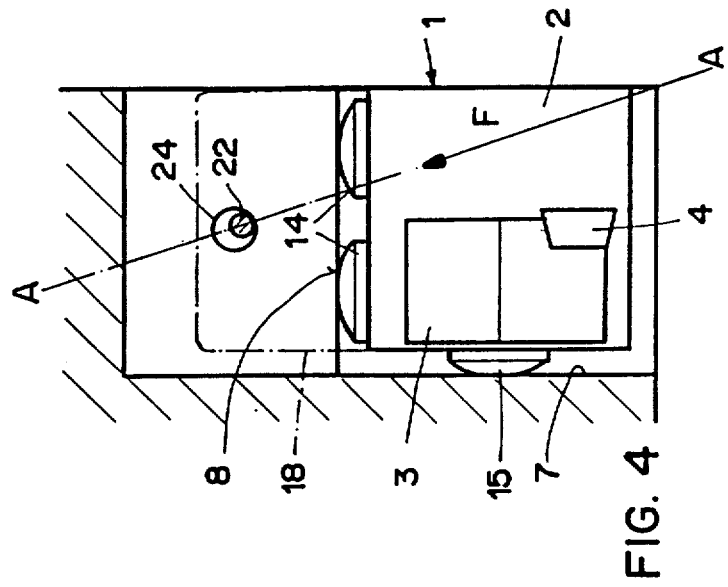
Figure 3:
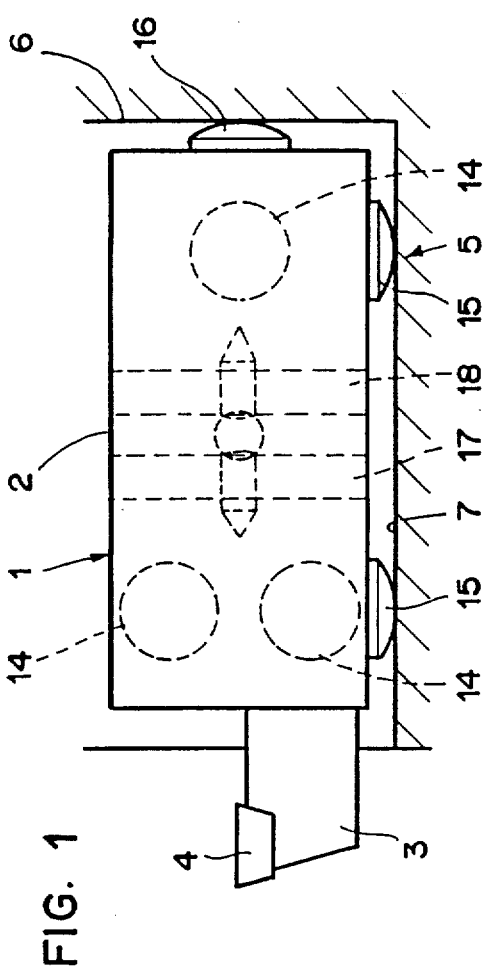
Figure 4:
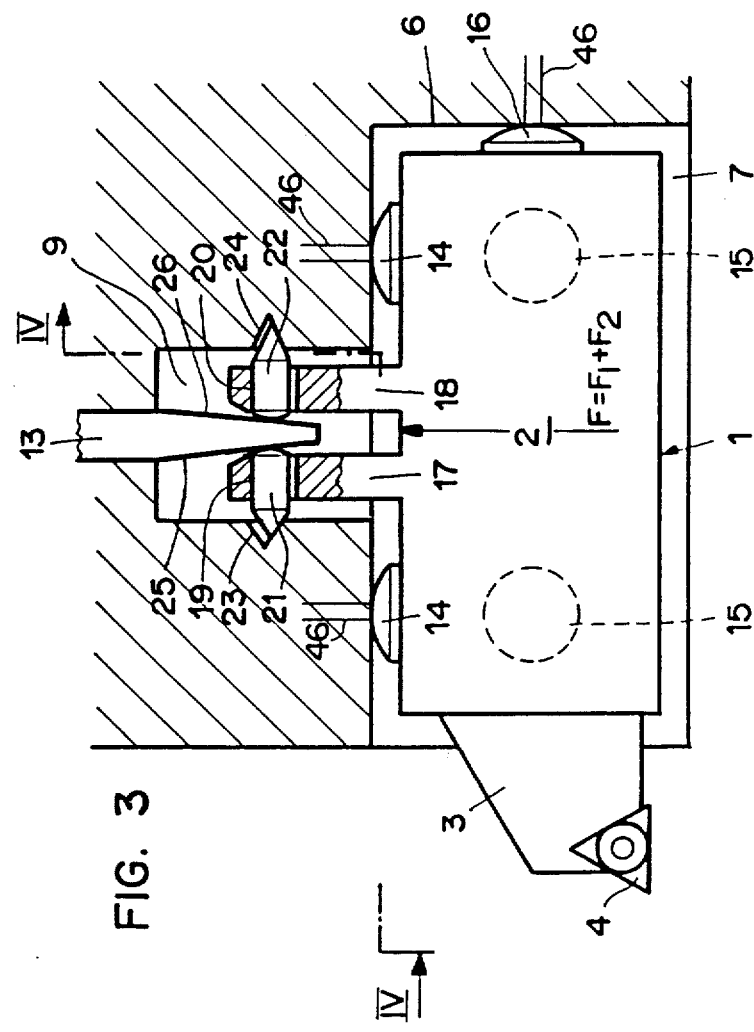
Figure 6:
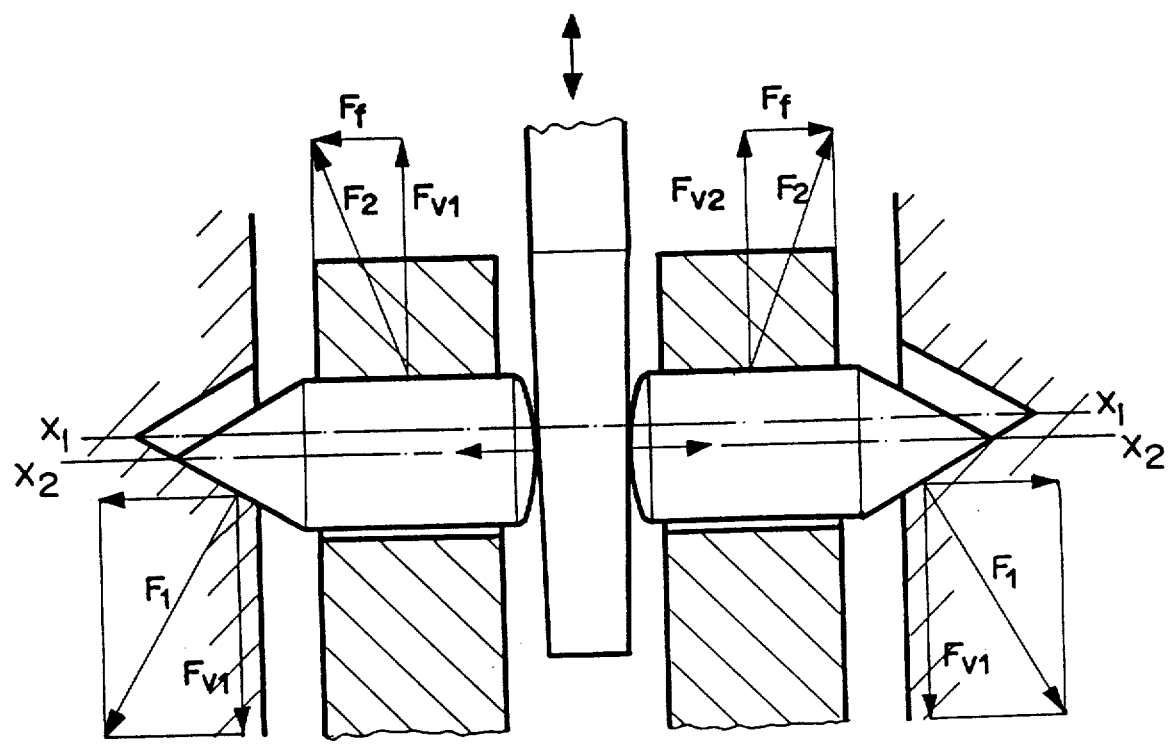

Two preferred embodiments of the invention will now be described in detail with reference to the accompanying drawings, in which:

FIGS. 1–4 are a diagrammatic elevation, end-on view, top plan view, and section taken on the line IV—IV of FIG. 3, respectively, of the tool-holder body and the retaining means in a first embodiment, FIG. 5 is a simplified perspective view of the tool-holder base and the tool-holder in a second embodiment, and FIG. 6 is a diagram on a larger scale showing the simplified balance of the forces produced by activation of the retaining means.

The tool-holder 1 shown in the drawing comprises a prismatic body 2 in the shape of a rectangular parallelepiped provided with an extension 3 to which a hard metal or ceramic plate 4 is fixed, e.g., by welding. The device will therefore be described on the basis of a turning tool, but it will be obvious that the body 2 might just as well be used to support other types of tools, including rotary tools such as drills or milling cutters. In FIGS. 1–4, mounting base 5 is shown diagramatically, and it will be seen to include a seat bounded by three flat main faces 6, 7, and 8 forming between them a trirectangular inner trihedron. Face 8 includes a seat 9 which may be of any suitable shape, as will be explained below.

During manufacture of the base, faces 6, 7, and 8 should be carefully machined and trued, at least locally, as will be shown below. They should be treated so as to have a suitable surface hardness.

Body 2 of tool-holder 1 has on one of its faces, intended to be positioned opposite face 8 of the trihedron, three spherical caps 14 disposed in a triangle at predetermined locations on body 2. On its face situated opposite face 7 of the trihedron, body 2 has two spherical caps 15 which, in a preferred form of the invention, are distributed on an axis parallel to the axis of symmetry of the arrangement of three caps 14. Finally, a sixth cap 16 is provided on the face of body 2 opposite face 6 of the trihedron. Cap 16 is likewise provided at a location predetermined to ensure the stability of the tool-holder, as will be seen below. Thus it is obvious that the only portions of the trihedron having to be treated and trued are localized opposite the aforementioned caps.

For co-operating with retaining means mounted on the base, the tool-holder body comprises a locking arrangement made up of two parallel flanges 17 and 18 which extend across the tool-holder body 2 and are arranged so as to be able to enter seat 9 of the base. In the middle of flanges 17 and 18 there are preferably coaxial cylindrical bores 19 and 20, respectively, in which are fitted cylindrical locking pins 21 and 22 which are longer than the flanges are thick, and the outer ends of which are conical. As may be seen in FIGS. 3 and 4, the conical tips of pins 21 and 22 co-operate with the inside faces of two conical recesses 23 and 24 in the sides of seat 9. It will be noted that the aperture angles of conical pins 21 and 22 are respectively the same as those of conical recesses 23 and 24. In a modification, these angles may be the same for each of the two pins 21 and 22, but in the example of FIG. 3, they are different. The essential point, however, is that the common axis of the two recesses 23 and 24 is slightly offset relative to the axis on which the conical tips of pins 21 and 22 must be situated when body 2 is suitably pressed by its six spherical caps against faces 6, 7, and 8 of the supporting trihedron of the base. The tool-holder bodies with their flanges 17 and 18 and pins 21 and 22 should therefore be dimensioned and adjusted in such a way that the position of the common axis of the tips of the pins relative to the tops of the spherical caps is exactly adjusted so that at the time of positioning, the respective axes $X_y$ and $X_2$ of the conical recesses and the conical tips are mutually offset. Hence it will be realized that when the tool-holder 1 is in place, if the pins 21 and 22 are urged to slide away from one another in their bores 19 and 20, part of the flank of their conical tips presses against part of the inside flank of the corresponding conical recess, so that the two cones tend to become coaxial. As a result, tool-holder 1 is then subjected to a force F, the direction of which is contained in the imaginary plane A defined by the two axes mentioned above.

Hence it will be understood that it is possible to construct tool-holder body 2 as a function of the size of the base and to position the spherical caps 14 and 16 so that—taking into account the stresses exerted on the tool-holder body during machining—the line of application of force F ensures the immobilization and stability of the tool-holder. This line of application, contained in the plane A defined by the two axes $X_y$ and $X_2$ of the tops of the pins and the tops of the recesses, will have a predetermined inclination relative the the plane faces 7 and 8 of the base.

To apply the force F, it suffices for a rod 13 to be connected, e.g., to a jack (not shown) mounted on the base. Rod 13 having two flat faces 25 and 26 in the shape of a wedge at the end, it will be seen that by moving in such a way as to fit faces 25 and 26 between the rearward ends of pins 21 and 22, rod 13 automatically causes the application of force F. The angle of surfaces 25 and 26 may be adjusted so that rod 13 is self-locking, which makes the mounting of the tool-holder secure. Therefore, in order to mount the tool-holder, it suffices for an operator to bring it approximately into the position shown in FIG. 3, pins 21 and 22 being retracted into their bores, and for the jack operating rod 13 to be actuated. In practice, pins 21 and 22 may be kept in bores 20 and 19 by balls and spring devices (not shown), or otherwise.

FIG. 5 shows another embodiment of the device. In this case, too, the tool-holder 27 holds a turning tool. Its body 28 has three flat faces 29, 30, 31 which constitute an outer trirectangular trihedron. When tool-holder 27 is brought by the operator in proximity to a base 32, body 28 fits into a seat 33, the inside faces of which have projecting spherical caps. Three projecting spherical caps 34 are situated in one face of seat 33 in such a way as to co-operate with face 29 of body 28. Two other projecting spherical caps 35 are made on surface portions of seat 33 corresponding to the two ends of face 31. Body 28 has near the middle of its face 31 two projecting flanges 36 and 37 provided with coaxial cylindrical bores 38 and 39 corresponding to bores 20 and 19 of the first embodiment. Finally, seat 33 also has a projecting spherical cap 40 corresponding to face 30 of body 28 of the tool-holder. FIG. 5 also shows a jack 41 suitable for controlling a rod analogous to rod 13, capable of fitting between flanges 36 and 37. Two conical-headed cylindrical pins 43 and 44 are slidably disposed in bores 38 and 39 and are urged apart when the rod of jack 41 is inserted between them. In this case, the retaining means operate as in the first embodiment. A seat 42 in base 32 has opposite flat faces with coaxial and opposite recesses 45 which co-operate with the conical tips of pins 43 and 44 as in the first embodiment.

Provision might also be made in a flank of seat 33 for an aperture and a bearing supporting rotary-drive means, tool-holder 27 being arranged to hold a rotary tool comprising coupling means capable of being automatically connected to coupling means of the base when the tool-holder is put in place.

Finally, the diagram in FIG. 6 shows the simplified balance of the forces operating on the various retaining elements at the moment when jack-rod 13 acts. By means of their conical tips, the pins exert on the flank of their seat a force $F_1$ which is perpendicular to the inclination of the flank of the seat. This flank acts as a ramp. Force $F_1$ has a vertical component $F_{v1}$ (FIG. 6). The pins are in turn subjected by the base to a force opposing the force $F_{v1}$ which they apply to the flanges of the tool-holder body. The smaller the aperture angles of the cones of the pin and the recess, the greater the forces $F_{v1}$.

Owing to the frictional forces $F_f$ between the sides of the bores and the sides of the pins in contact therewith, the actual forces exerted by the pins on the tool-holder body are the forces $F_2$ composed of the sum of the resultant forces $F_{v1}$ and the frictional forces $F_f$. Finally, the force F applied to the tool-holder body is the sum of the two forces $F_2$. However, the more acute the angle of the pin tip and the recess, the greater the inevitable friction between the cylindrical surface of the pin and the side of the bore in which it moves. If, however, these angles are more acute on one side of the retaining elements than on the other, e.g., on the righthand side as viewed in FIG. 3, the resultant pressing force F exerted on tool-holder 1 will further have a component directed toward face 6, so that spherical cap 16 will be pressed against that face.

Thus the device described above makes it possible to bring the tool-holder body to bear upon its seat in an exactly defined manner, exerting upon it a force having a line of action and value which are likewise predetermined. Experience has shown that (a) the repositioning precision is better than 5 microns, (b) the rigidity of the supports is greater than 100 daN/micron, (c) automatic placement is possible in at least two perpendicular directions, (d) the installation of means for transmitting the rotary drive of a rotary tool, as well as the circulation of the cutting oil, poses no problems.

The radius of the spherical caps is determined as a function of the respective deformations of tool-holder 1 and base 5 (FIG. 1) so that the point of contact between the cap and the base is always situated within the surface of the cap. It should be understood that the radius of the spherical cap should be as large as possible; and the more rigid the co-operating parts 2 and 5, the larger the radius may be. Cleaning nozzles 46 are disposed near the spherical caps (FIG. 3) in such a way that the latter can be periodically cleaned by projection of a fluid.

What is claimed is:

1. A device for mounting a tool-holder having a rigid body on a tool-mounting base in a machining center, of the type in which said base or said body constitutes a first part of said device and the other of said body or said base constitutes a second part, said first part includes a plurality of fixed support-surface portions defining a support trihedron thereon, said second part includes a plurality of projecting surface portions and both said parts include cooperating means for applying a pressing force to said body for pressing said projecting surface portions against respective said supporting-surface portions, wherein the improvement comprises said projecting surface portions being convex cap surfaces, said cap surfaces being distributed in such a manner than at least a first group thereof cooperate with a first one of said fixed support-surface portions and a second group thereof cooperate with a second one of said fixed surface portions, and said cooperating means are arranged for pressing each one of said cap surfaces against the corresponding fixed surface portion with a predetermined pressing force, the sum of said pressing forces forming a resulting pressing force and said resulting pressing force having a predetermined line of action, said line of action having an orientation for immobilizing said body and said support with respect to one another independent of machining force.

2. The device of claim 1, wherein said tool-holder is trirectangular, said line of action being oriented obliquely relative to at least two faces of said tool-holder.

3. The device of claim 2 comprising three said cap surfaces co-operating with a first face of said tool-holder, two said cap surfaces co-operating with a second face of said tool-holder, and one cap surface co-operating with the third face of said tool-holder.

4. The device of claim 1, wherein said cooperating means include two coaxial and opposing said sliding elements having conical tips and two said ramps formed by coaxial conical recesses, the axes of said recesses and of said sliding elements being parallel and defining the inclination of said plane containing said line of action.

5. The device of claim 4, wherein one of said conical tips and the associated one of said conical recesses have an aperture angle different from the aperture angle of the other of said conical tips and the associated other one of said conical recesses.

6. The device of claim 1, wherein said cap surfaces are spherical and have a radius of curvature satisfying the following conditions:
  (a) being the largest possible for offering maximum rigidity of contact and
  (b) always having the point of contact between said base and said cap surfaces within the spherical surface despite the foreseeable deformations of the tool-holder and said base.

7. The device of claim 1, further comprising cleaning nozzles disposed near said cap surfaces.

8. A device according to claim 1 wherein said cooperating means comprise on the one hand one or more ramps integral with said base and one or more sliding elements cooperating with guiding means on said body and with said ramps, and on the other hand an actuating component, guiding means for said actuating component, integral with said base, and actuating means for moving said actuating component to displace said one or more sliding elements, the direction of guidance of said sliding elements and the orientation of said ramps determining a plane which contains said line of action.

9. The device of claim 8, wherein said base includes a recess allowing the tool-holder to be positioned in several directions.

* * * * *

UNITED STATES PATENT AND TRADEMARK OFFICE
CERTIFICATE OF CORRECTION

PATENT NO.  : 4,850,255

DATED       : July 25, 1989

INVENTOR(S) : Francois PRUVOT et al.

It is certified that error appears in the above-identified patent and that said Letters Patent is hereby corrected as shown below:

IN THE DRAWINGS:

The attached 2 drawing sheets depicting Figs. 1-4 and 6 should be substituted for the corresponding drawing sheets depicting Figs. 1-4 and 6 in the patent.

IN THE SPECIFICATION:

Column 3, line 20, change "$X_y$" to --$X_1$--;

line 38, change "$X_y$" to --$X_1$--.

Signed and Sealed this

Twenty-first Day of August, 1990

Attest:

HARRY F. MANBECK, JR.

Attesting Officer    Commissioner of Patents and Trademarks